(12) United States Patent
Dente

(10) Patent No.: US 10,378,251 B2
(45) Date of Patent: Aug. 13, 2019

(54) ELECTRONIC LATCH OF A MOTOR-VEHICLE CLOSURE DEVICE, PROVIDED WITH AN IMPROVED BACKUP ENERGY SOURCE

(71) Applicant: Magna Closures Inc., Newmarket (CA)

(72) Inventor: Davide Dente, Pisa (IT)

(73) Assignee: MAGNA CLOSURES INC., Newmarket (CA)

( * ) Notice: Subject to any disclaimer, the term of this patent is extended or adjusted under 35 U.S.C. 154(b) by 424 days.

(21) Appl. No.: 14/653,235

(22) PCT Filed: Dec. 24, 2013

(86) PCT No.: PCT/EP2013/077992
§ 371 (c)(1),
(2) Date: Jun. 17, 2015

(87) PCT Pub. No.: WO2014/102282
PCT Pub. Date: Jul. 3, 2014

(65) Prior Publication Data
US 2015/0330116 A1 Nov. 19, 2015

Related U.S. Application Data

(60) Provisional application No. 61/748,262, filed on Jan. 2, 2013, provisional application No. 61/748,274, filed
(Continued)

(30) Foreign Application Priority Data

Dec. 24, 2012 (IT) .............................. TO2012A1143
Dec. 24, 2012 (IT) .............................. TO2012A1144
Dec. 24, 2012 (IT) .............................. TO2012A1145

(51) Int. Cl.
*H02J 7/00* (2006.01)
*H02J 7/34* (2006.01)
(Continued)

(52) U.S. Cl.
CPC .............. *E05B 77/12* (2013.01); *B60L 58/12* (2019.02); *B60L 58/21* (2019.02); *B60L 58/25* (2019.02);
(Continued)

(58) Field of Classification Search
CPC .............................. E05B 81/86; H02J 7/0052
See application file for complete search history.

(56) References Cited

U.S. PATENT DOCUMENTS 6,881,912 B2    4/2005    Kobayashi et al.
6,914,346 B2 *  7/2005    Girard ..................... E05B 77/12
                                                          307/10.1
(Continued)

FOREIGN PATENT DOCUMENTS

DE        20121915 U1    10/2003
EP         0694664 A1    1/1996
(Continued)

*Primary Examiner* — Jeffrey M Shin
(74) *Attorney, Agent, or Firm* — Dickinson Wright PLLC

(57) ABSTRACT

An electronic latch assembly for a closure device of a motor vehicle, having an actuator group operable to control actuation of the closure device and an electric motor controllable to drive the actuator group and supplied, during a normal operating condition, by a main power source of the motor vehicle providing a main supply voltage (Vbatt); the electronic latch assembly has a backup energy source, and a control unit controlling the backup energy source to supply the electric motor during a failure operating condition. The backup energy source has a supercapacitor group, which stores energy during the normal operating condition and provides a backup supply voltage (Vsc) to supply the electric motor (9) during the failure operating condition.

23 Claims, 7 Drawing Sheets

Related U.S. Application Data on Jan. 2, 2013, provisional application No. 61/748,286, filed on Jan. 2, 2013.

(51) Int. Cl.
*B60L 58/12* (2019.01)
*B60L 58/21* (2019.01)
*B60L 58/25* (2019.01)
*E05B 77/12* (2014.01)
*E05B 81/14* (2014.01)
*E05B 81/86* (2014.01)

(52) U.S. Cl.
CPC .............. *E05B 81/14* (2013.01); *E05B 81/86* (2013.01); *H02J 7/0052* (2013.01); *H02J 7/345* (2013.01)

(56) References Cited

U.S. PATENT DOCUMENTS

2007/0145821 A1* 6/2007 Mekky ............... E05B 77/02
                                                           307/10.1
2009/0088993 A1    4/2009  Oohasi et al.
2014/0175813 A1    6/2014  Margheritti et al.
2015/0001926 A1*   1/2015  Kageyama ........... B60R 16/033
                                                           307/10.1
2015/0340882 A1*  11/2015  Goth ..................... H02J 7/0052
                                                           320/167

FOREIGN PATENT DOCUMENTS

| | | |
|---|---|---|
| EP | 0856625 A1 | 8/1998 |
| EP | 1335087 A1 | 8/2003 |
| EP | 2112739 A1 | 10/2009 |
| FR | 2857399 A1 | 1/2005 |
| JP | 2000064685 A | 2/2000 |
| JP | 2001303821 A | 10/2001 |
| JP | 2007030650 A | 2/2007 |
| JP | 2008005662 A | 1/2008 |
| JP | 2008029064 A | 2/2008 |
| JP | 2009144441 A | 7/2009 |
| JP | 2009257008 A | 11/2009 |
| WO | WO2005/047628 A1 | 5/2005 |

* cited by examiner

US 10,378,251 B2

ELECTRONIC LATCH OF A MOTOR-VEHICLE CLOSURE DEVICE, PROVIDED WITH AN IMPROVED BACKUP ENERGY SOURCE

CROSS-REFERENCE TO RELATED APPLICATION

This application is a National Stage of International Application No. PCT/EP2013/077992 filed Dec. 24, 2013 and which claims the benefit and priority of Italian Patent Application Nos. TO2012A001143, TO2012A001144, and TO2012A001145 all filed Dec. 24, 2012 and U.S. Provisional Application No. 61/748,262, U.S. Provisional Application No. 61/748,274, and U.S. Provisional Application No. 61/748,286 all filed Jan. 2, 2013. The entire disclosure of each of the above applications is incorporated herein by reference.

TECHNICAL FIELD

The present invention relates to an electronic latch (commonly known as e-latch) of a motor-vehicle closure device, provided with an improved backup energy source.

BACKGROUND ART

In the following description and the accompanying claims, the expression "closure device" will be used to generally indicate any element movable between an open position and a closed position, respectively opening and closing an access to an inner compartment of a motor vehicle, therefore including, boot, rear hatches, bonnet lid or other closed compartments, window regulators, sunroofs, in addition to the side doors of a motor vehicle, to which the following description will make explicit reference, purely by way of example.

It is known that electrical latches are provided in motor vehicles, for example for controlling opening and closing of the side doors.

An electrical door latch generally includes a ratchet that is selectively rotatable with respect to a striker fixed to a door post, in order to latch and unlatch the door. The electrical door latch includes a pawl that selectively engages the ratchet to prevent the ratchet from rotating. The electrical door latch includes an electric motor, which is electrically connected to a main electric power supply of the vehicle (for example to the 12V battery of the same vehicle), in order to directly or indirectly drive the pawl, via an electrically-operated actuator.

As it is known, a common problem related to electrical latches is that of controlling, as it is also required by security regulations, opening and closing of the doors even in case of failure of the main power supply of the vehicle, or in case of interruptions or breaking of the electrical connection between the main power supply and the electric motor in the latch; this kind of situation may occur for example in case of an accident or crash involving the vehicle.

A possible solution to this problem envisages the use of a mechanical release mechanism in the latch, which serves as a manual backup to the electrically activated side door latch.

However, the presence of a redundant mechanical mechanism entails higher area occupation and weight and additional costs, and also represents a further constriction for designing the door.

Therefore, the use of a backup power source for the electrical latch has been proposed, in order to supply electrical energy to the electric motor of the latch, in case of failure or interruption of the vehicle main power supply.

This backup power source is usually kept in a charged state during normal operation, by the main power supply, so as to be readily available as soon as the need arises, for example in case of a crash or accident.

However, designing of a backup power source, and of the related electronic circuitry, for the electric latch assembly has proven to be a difficult task, for example due to size requirements, as also has proven to be difficult meeting desired electrical performance, for example in terms of energy density or current output, especially in automotive operating conditions.

In this respect, EP 0 694 664 A1 discloses a backup energy source for a door latch, designed to supply power to the latch during emergency situations, which envisages an auxiliary battery arranged within the door where the latch is placed.

Another known solution, discussed in DE 201 21 915 U1, discloses the use of a capacitor group as a backup power source for a vehicle door latch. The capacitor group is coupled to a circuit board, externally connected to the latch assembly. The capacitor group includes a vast number of capacitors, of the high voltage type (withstanding up to V), series or parallel connected, thus requiring a relevant amount of space on the circuit board; moreover, such solution generally needs a further backup energy source, since the supercapacitor group may only be able to supply power for a limited amount of time. In other words, the capacitor group may not be able to guarantee a sufficient and autonomous backup energy source for the vehicle latch.

A need is therefore felt in the field for an optimized and reliable backup power source for an electric latch in a motor vehicle.

DISCLOSURE OF INVENTION

It is therefore an object of certain aspects of the present invention to provide an electronic latch with a backup power source, designed to meet the aforementioned need.

This object can be achieved by an electronic latch, as defined in the appended claims.

BRIEF DESCRIPTION OF THE DRAWINGS

A preferred, non-limiting embodiment of certain aspects of the present invention will be described by way of example with reference to the accompanying drawings, in which.

BEST MODE FOR CARRYING OUT THE INVENTION

Figure 1:
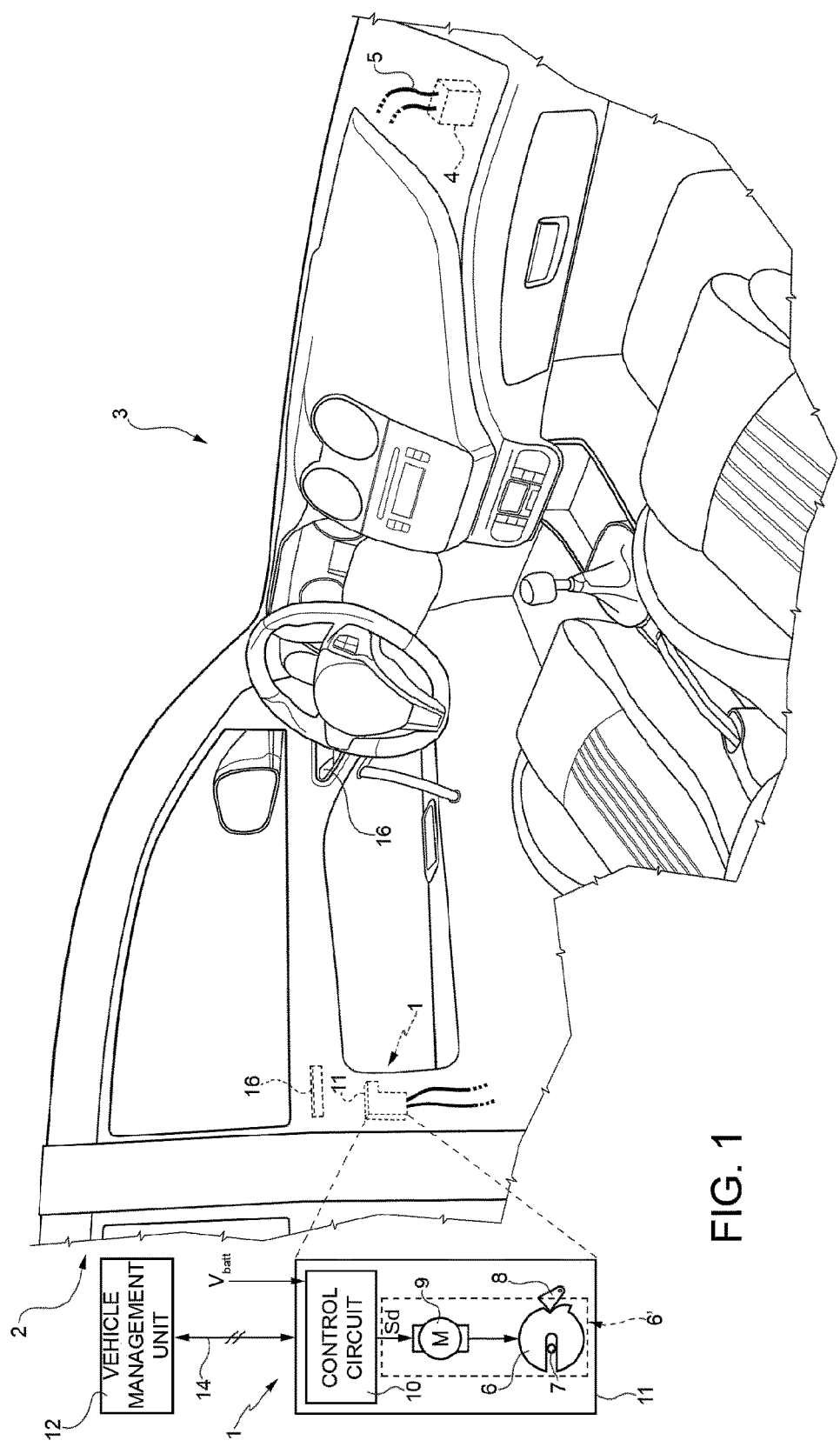
FIG. 1 is a schematic representation of a motor vehicle with a closure device and a related e-latch assembly.

Number 1 in FIG. 1 indicates as a whole an electronic latch assembly (hereinafter e-latch assembly 1), coupled to a side door 2 of a motor vehicle 3 (however, it is again underlined that the e-latch assembly 1 may equally be coupled to any kind of closure device of the motor vehicle 3).

The e-latch assembly 1 is electrically connected to a main power source 4 of the motor vehicle 3, for example a main battery providing a battery voltage $V_{batt}$ of 12 V, through an electrical connection element 5, for example a power cable (the main power source 4 may equally include a different source of electrical energy within the motor vehicle 3, for example an alternator).

The e-latch assembly 1 includes an actuation group 6', including an electric motor, operable to control actuation of the door 2 (or in general of the vehicle closure device).

In a possible embodiment, the actuation group 6' includes a ratchet 6, which is selectively rotatable to engage a striker 7 (fixed to the body of the motor vehicle 3, for example to the so called "A pillar" or "B pillar", in a manner not shown in detail). When the ratchet 6 is rotated into a latching position with respect to the striker 7, the side door 2 is in a closed operating state. A pawl 8 selectively engages the ratchet 7 to prevent it from rotating, driven by an electric motor 9 so as to move between an engaged position and a non-engaged position.

The e-latch assembly 1 further includes an electronic control circuit 10, for example including a microcontroller or other known computing unit, which may be conveniently embedded and arranged in a same housing or case 11 (shown schematically) with the actuation group 6' of the e-latch assembly 1, thus providing an integrated compact and easy-to-assemble unit.

The electronic control circuit 10, as will be shown in more details in the following, is coupled to the electric motor 9 and provides driving signals $S_d$ thereto.

The electronic control circuit 10 is electrically coupled to a vehicle main management unit (also known as main ECU or "vehicle body computer") 12, which is configured to control general operation of the motor vehicle 3, via a data bus 14, so as to exchange signals, data, commands and/or information.

Figure 2:
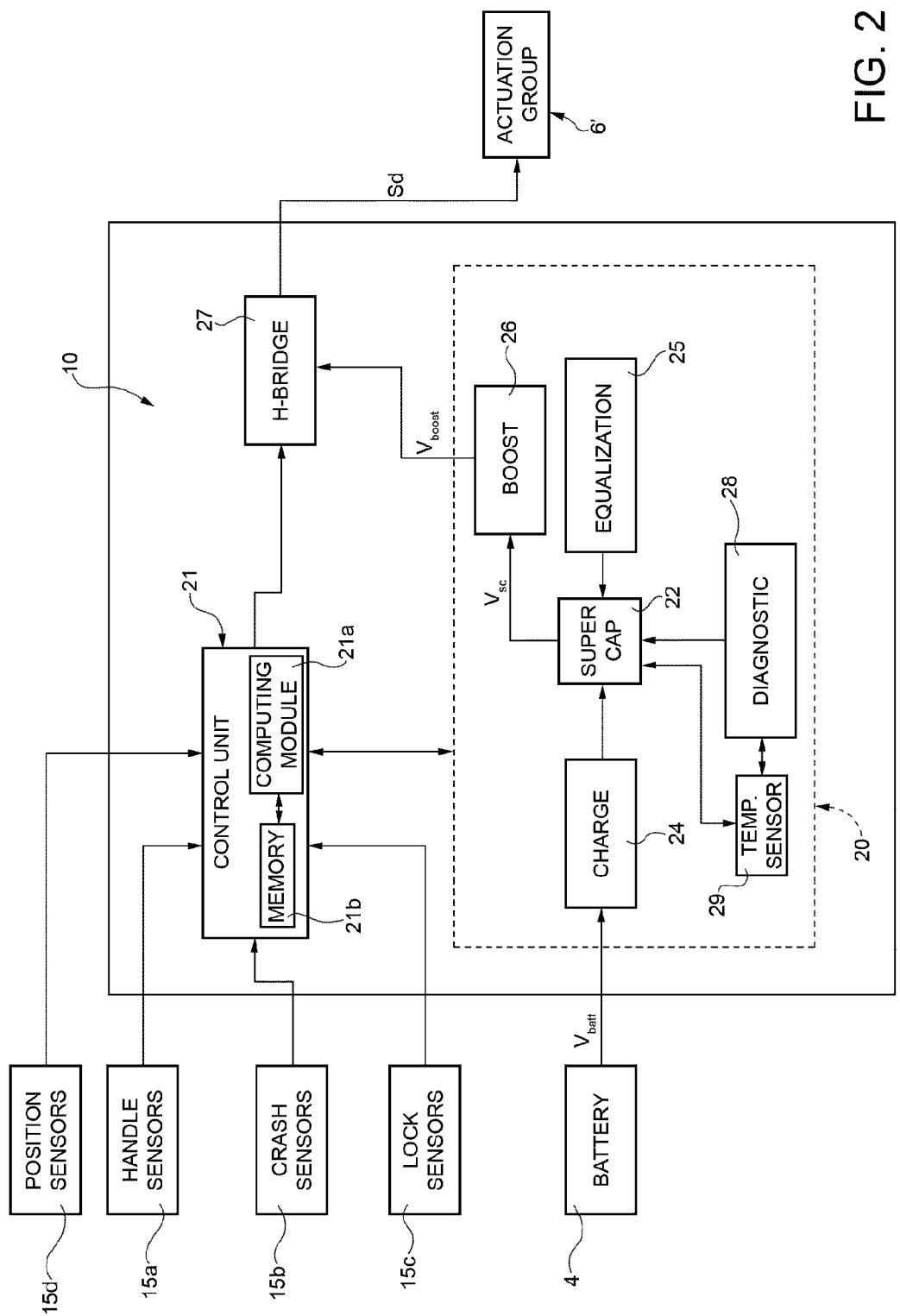
FIG. 2 is a general block diagram of an electronic control circuit of the e-latch assembly of FIG. 1.

Moreover, as shown also in FIG. 2, the electronic control circuit 10 is (directly, and/or indirectly via the vehicle management unit 12) coupled to several different sensors 15 (shown schematically) of the motor vehicle 3, such as: handle-reading sensors 15a (which read actuation of external and/or internal handles 16), crash sensors 15b, lock switch sensors 15c, and the like; conveniently, the electronic control circuit 10 also receives feedback information about the latch actuation from position sensors 15d, such as Hall sensors, configured to detect the operating position, for example of the ratchet 6 and/or pawl 8.

The electronic control circuit 10 is also coupled to the main power source 4 of the motor vehicle 3, so as to receive the battery voltage $V_{batt}$; the electronic control circuit 10 is thus able to check if the value of the battery voltage $V_{batt}$ decreases below a predetermined threshold value, to promptly determine if an emergency condition (when a backup energy source may be needed) occurs.

As shown in the schematic block diagram of FIG. 2, the electronic control circuit 10 includes an embedded and integrated backup energy source 20, which is configured to supply electrical energy to the actuation group 6' and latch electric motor 9, and to the same electronic control circuit 10, in case of failure or interruption of the main power supply from the main power source 4 of the motor vehicle 3.

In more details, the electronic control circuit 10 includes a control unit 21, for example provided with a microcontroller, microprocessor or analogous computing module 21a, coupled to the backup energy source 20 and the actuation group 6 of the e-latch assembly 1, to control their operation.

The control unit 21 has an embedded memory 21b, for example a non-volatile random access memory, coupled to the computing module 21a, storing suitable programs and computer instructions (for example in the form of a firmware). It is recognized that the control unit 21 may alternatively comprise a logical circuit of discrete components to carry out the functions of the computing module 21a and memory 21b.

According to an aspect of the present solution, the backup energy source 20 includes a group of low voltage supercapacitors 22 (hereinafter supercap group 22), as an energy supply unit (or energy tank) to provide power backup to the e-latch assembly 1, even in case of power failures. Supercapacitors may include electrolytic double layer capacitors, pseudocapacitors or a combination thereof.

Supercapacitors advantageously provide high energy density, high output current capability and have no memory effects; moreover, supercapacitors have small size and are easy to integrate, have extended temperature range, long lifetime and may withstand a very high number of charging cycles. Supercapacitors are not toxic and do not entail explosive or fire risks, thus being suited for hazardous conditions, such as for automotive applications.

Figure 3:
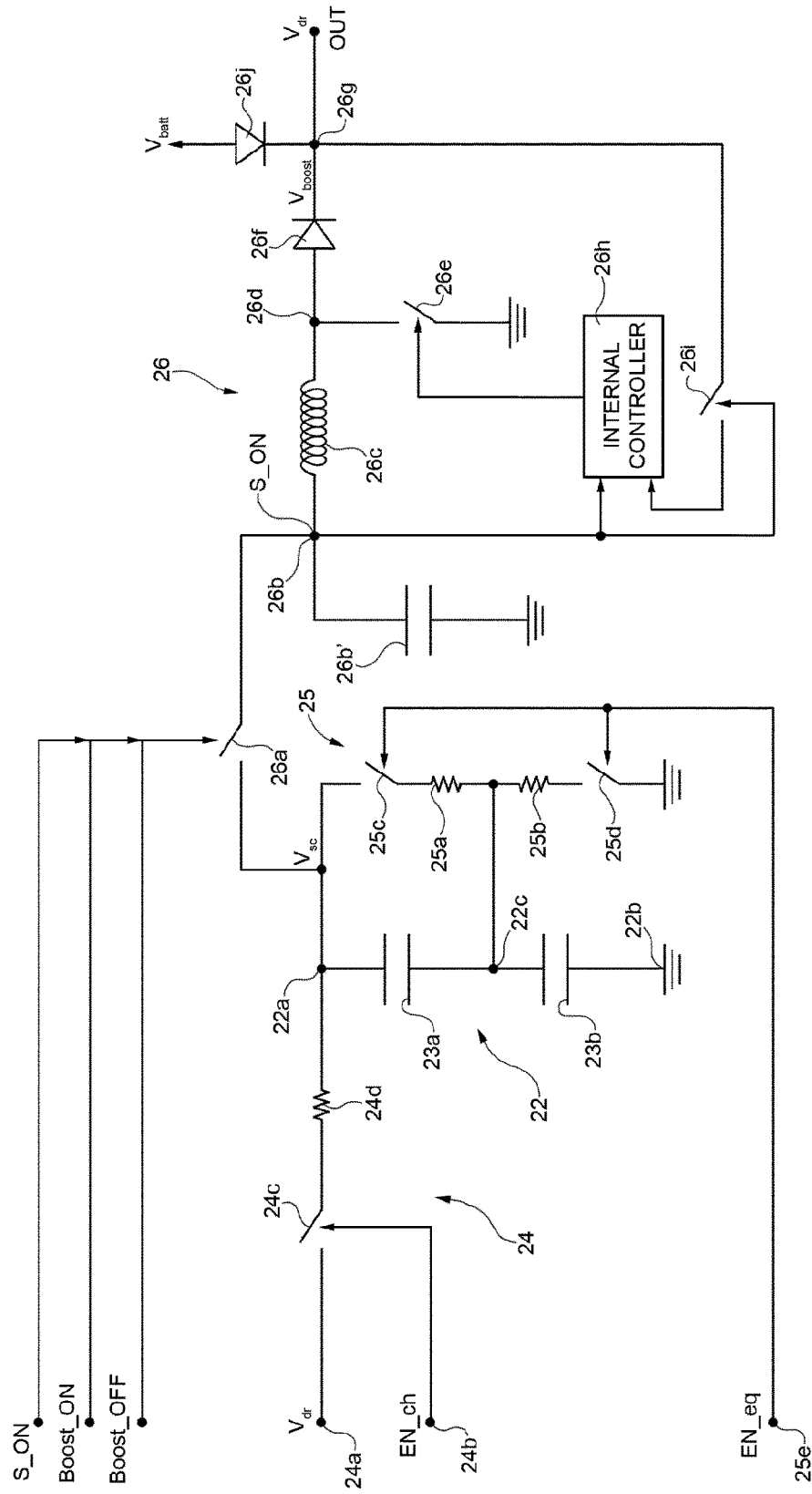
FIG. 3 is a circuit diagram of the electronic control circuit of FIG. 2.

In a possible embodiment, as shown in FIG. 3, the supercap group 22 may include two supercapacitor cells 23a, 23b, connected in series between a first node 22a and a second node 22b (for example connected to a reference ground potential) and defining an intermediate node 22c, each providing, when charged, a voltage level for example of 2.5 V-2.7 V, in order to jointly provide on the first node 22a a supercap voltage $V_{sc}$, for example in the order of 3 V-5 V, which may be used as a backup power supply, in emergency situations, when the energy from the main power source 4 of the motor vehicle 3 is not available. Supercapacitor cells 23a, 23b are thus of a low voltage type and also have a high capacity, for example in the order of 16 F-20 F, for example 18 F.

As will be discussed in more details hereinafter, the backup energy source 20 further includes a charge module 24; an equalization module 25 and a boost module 26.

The charge module 24 is electrically coupled to the supercap group 22 and is configured to recharge, starting from the battery voltage $V_{batt}$, whenever power from the main power source 4 is available, the supercap group 22, so that the same supercap group 22 may offer a full energy storage for emergency situations and any leakage currents are compensated.

The equalization module 25 is electrically coupled to the supercap group 22, and is configured to ensure that both supercapacitor cells 23a, 23b have a desired cell voltage value, in particular a same cell voltage value during operation (to achieve a balanced operating condition). The equalization module 25 also avoids that supercapacitor cells 23a, 23b have a cell voltage over a maximum desired cell voltage level, protecting the supercapacitors against overcharging.

The boost module 26 receives at its input the supercap voltage $V_{sc}$ generated by the supercap group 22, and is configured to boost, that is to increase, its value up to automotive standard voltages (for example 9 V-16 V), and to provide enough output current capability to drive standard automotive electric motors, such as the electric motor 9 of the e-latch assembly 1. Indeed, the supercap voltage $V_{sc}$ may be too low to provide an effective back-up power source to directly drive the electric motor 9 in emergency situations, like lost or insufficient power supply from main power source 4 of the motor vehicle 3.

The boost module 26 thus provides at its output (that is also the output of the backup energy source 20) a boosted voltage $V_{boost}$, as a function of the supercap voltage $V_{sc}$. The boosted voltage $V_{boost}$ is then received by an output module of the electronic control circuit 10, for example including an integrated H-bridge module 27, whose output drives the electric motor 9 of the e-latch assembly 1.

The backup energy source 20 further includes a diagnostic module 28, which is operatively coupled to the supercap group 22 and is configured to monitor the health status of the supercapacitors during the charging process and based on the same charging process, by measuring their voltage value, capacitance value, and internal equivalent resistance (DCR—Direct Current Resistance), again as will be discussed hereinafter.

A temperature sensor 29 is configured to monitor the operating temperature of the supercap group 22, and it is coupled to the diagnostic module 28 to provide the detected temperature information; for example, temperature sensor 29 may include an NTC (Negative Temperature Coefficient) resistor arranged in the proximity of the supercap group 22.

The diagnostic module 28 is operatively coupled to the control unit 21, to provide diagnostic information thereto, for example including the value of the supercap voltage $V_{sc}$. In a possible embodiment, not shown, the diagnostic module 28 may be implemented in the control unit 21, as a diagnostic routine run by the microprocessor or microcontroller thereof.

In more details, and as shown in the schematic circuit diagram of FIG. 3, the charge module 24 of the backup energy source 20 has a first input 24a, which is designed to receive a driving voltage $V_{dr}$, whose value is the higher between the boosted voltage $V_{boost}$ and the battery voltage $V_{batt}$; in particular, the driving voltage $V_{dr}$ is equal to the battery voltage $V_{batt}$ during normal operation of the e-latch assembly 1, for charging of the supercap group 22, and is equal to the boosted voltage $V_{boost}$ from the boost module 26 during emergency or failure situations.

The charge module 24 also has a second input 24b, which is designed to receive a charge-enable signal En_ch from the control unit 21 of the electronic control circuit 10, that is a digital signal whose value is indicative of the requirement, determined by the same control unit 21, of enabling or stopping the charge of the supercap group 22.

The charge module 24 includes a power switch 24c and a power resistor 24d.

The power switch 24c, for example a solid state switch like a MOSFET switch, is connected between the first input 24a and the power resistor 24d, and has a control terminal coupled to the second input 24b, thereby receiving the charge-enable signal En_ch.

The power resistor 24d is coupled between the power switch 24c and the first node 22a of the supercap group 22.

When enabled by the charge-enable signal En_ch via the power switch 24c, charging of the supercap group 22 at the battery voltage $V_{batt}$ occurs through the power resistor 24d.

In particular, the control unit 21 of the electronic control circuit 10 may generate a PWM (Pulse Width Modulated) charge-enable signal En_ch, during charging of the supercap group 22, thus connecting and disconnecting in rapid succession the supercap group 22 to the battery voltage $V_{batt}$.

As previously indicated, charging of the supercap group 22 may be a continuous process, as long as the control unit 21 of the electronic control circuit 10 senses a value of the battery voltage $V_{batt}$ higher than a preset threshold, indicative of a possible failure affecting the main power source 4.

The equalization module 25, in a possible passive embodiment, includes a first and a second equalizing resistors 25a, 25b, having a same resistance value. The first equalizing resistor 25a is connected between the intermediate node 22c and the first node 22a of the supercap group 22, via the interposition of a first equalizing switch 25c, thus being selectively connectable in parallel to the first supercapacitor cell 23a; the second equalizing resistor 25b is connected between the intermediate node 22c and the second node 22b of the supercap group 22, via the interposition of a second equalizing switch 25d, thus being selectively connectable in parallel to the second supercapacitor cell 23b.

The first and the second equalizing switches 25c, 25d are solid state switches, for example including a respective MOSFET transistor, both controlled by an equalizing enable signal EN_eq received from the control unit 21 of the electronic control circuit 10 at a control input 25e of the equalization module 25.

In particular, the equalizing enable signal EN_eq controls the first and second equalizing switches 25c, 25d so as to enable or disable the equalization process, in order to save energy stored in the supercap group 22, when the same supercap group 22 is not used as a backup power source.

The boost module 26 is implemented, in a possible embodiment, by a PWM boost converter (or dc-dc step up converter), and includes an enabling switch 26a, for example a MOSFET solid state switch, connected between the first node 22a of the supercap group 22, thus receiving the supercap voltage $V_{sc}$, and a first intermediate node 26b.

A storage capacitor 26b' is coupled to the first intermediate node 26b, and is charged to the supercap voltage $V_{sc}$, when the enabling switch 26a is closed, defining on the same intermediate node 26b a self-activation signal S_ON, having a high voltage value.

The enabling switch 26a has a control terminal receiving a boost disabling signal boost_OFF from the control unit 21 of the electronic control circuit 10; during normal operation, when the main power source 4 is available, the boost disabling signal boost_OFF disables, and keeps in the OFF state, the PWM boost converter, since the sensed battery voltage $V_{batt}$ is not critical.

The control terminal of the enabling switch 26a also receives a boost enabling signal boost_ON, whose value is determined by external user events (that is it is not generated by the control unit 21, internally to the electronic control circuit 10), and the activation signal S_ON.

The boost module 26, after being activated, is self maintained in an ON state, in particular by the high value of the activation signal S_ON, until it is switched off by the control unit 21 of the electronic control circuit 10, when backup energy is no more needed or energy is to be kept stored in the supercap group 22.

According to a possible embodiment, the boost enabling signal boost_ON switches to the ON state, thus enabling the PWM boost converter, as soon as the handle-reading sensors 15a detects user activation of the internal or external handles 16 of a side door 2 of the motor vehicle 3; therefore, during an emergency situation, when there is a failure in the main power source 4, the backup energy source 20 is promptly available for supplying the e-latch assembly 1.

In particular, the boost module 26 includes: a boost inductor element 26c connected between the first intermediate node 26b and a second intermediate node 26d; a boost switch 26e, for example a solid state switch like a MOSFET switch, connected between the second intermediate node 26*d* and the ground reference potential and having a control terminal; and a boost diode element 26*f*, connected between the second intermediate node 26*d* and an output node 26*g* (also representing an output terminal OUT for the whole backup energy source 20), on which the boosted voltage $V_{boost}$ is selectively provided.

According to an aspect of the present solution, the boost module 26 further includes an internal controller 26*h*, in particular a PWM controller, which is configured to provide a PWM control signal to the control terminal of the boost switch 26*e*, so as to control its boosting operation (in a known manner, here not discussed in detail).

The internal controller 26*h* is coupled to the first intermediate node 26*b*, to receive the supercap voltage $V_{sc}$, and is able to autonomously manage boost activation and deactivation, thereby making it possible to enable the backup energy source 20 even without any further action from the control unit 21 of the electronic control circuit 10.

A feedback switch 26*i* is connected between the output node 26*g* and the internal controller 26*h* to provide feedback on the value of the boosted voltage $V_{boost}$.

The control terminal of the feedback switch 26*i* is also coupled to the first intermediate node 26*b*, to receive the activation signal S_ON, when the enabling switch 26*a* is closed.

When switched to the closed state by the supercap voltage $V_{sc}$, a feedback path is defined, to allow a closed loop voltage regulation by the internal controller 26*h* (a voltage divider, not shown, implemented via partition resistors, may be present, to provide the voltage feedback from the boosted voltage $V_{boost}$).

The feedback switch 26*i* returns to the open state, as soon as the boost module 26 is deactivated, so as to reduce the power consumption over the feedback path, which is indeed interrupted.

The boost module 26 further includes a selection diode 26*j*, having its cathode terminal connected to the output node 26*g* and its anode terminal receiving the battery voltage $V_{batt}$.

Accordingly, on the output terminal OUT of the backup energy source 20, the highest between the battery voltage $V_{batt}$ and the boosted voltage $V_{boost}$ is provided, as the driving voltage $V_{dr}$, which will then drive the electric motor 9 of the e-latch assembly 1 (and also charge the supercap group 22).

The operation of the diagnostic module 28 of the backup energy source 20 is now discussed in more details.

In a possible embodiment, the diagnostic module 28 may be implemented in the control unit 21 of the electronic control circuit 10, as a diagnostic routine run by the microprocessor or microcontroller of the computing module 21*a*; the control unit 21 may monitor for this reason the value of the supercap voltage $V_{sc}$ and/or the voltage value at the intermediate node 22*c* between the supercapacitor cells 23*a*, 23*b*.

In a possible embodiment, also the temperature sensor 29 may be integrated within the control unit 21.

Possible failure modes, which are monitored by the diagnostic module 28 and may affect any one, or both, of the supercapacitor cells 23*a*, 23*b* are the following:
  open circuit failure;
  short circuit failure;
  increase of the leakage current;
  increase of the equivalent series resistance;
  decrease of the capacitance value.

These failure modes may be detected in real time during operation of the e-latch assembly 1, using particular logic and algorithms envisaged by the diagnostic routine.

In particular, an "open circuit" failure for any one of the two supercapacitor cells 23*a*, 23*b* generates a corresponding failure in the whole series, which may be detected whenever a substantially zero voltage is present on the supercapacitor series, even if charged.

A "short circuit" failure of a supercapacitor cell 23*a*, 23*b* of the series generates the doubling of the series capacitance and a corresponding reduction of the value of the supercap voltage $V_{sc}$; the fully charged voltage value may not be reached and/or may not be maintained over time.

An increase of the "leakage current" may be detected when the charged state of the supercapacitor cells 23*a*, 23*b* (whose value may be set, as a preset threshold) is not obtained, even after a long charging time, or when the value of the supercap voltage $V_{sc}$ over the series undergoes an unexpected variation (for example a variation not compatible with the charging process that is being applied to the supercap group 22).

The increase of the "equivalent series resistance" of any one of the supercapacitor cells 23*a*, 23*b* determines an increase of the resistance of the whole series, while the decrease of the "capacitance" of any one of the supercapacitor cells 23*a*, 23*b* determines an increase of the capacitance of the whole series.

Open circuit and short circuit failures determine a complete failure of the backup energy source 20, since the energy storage function of the supercapacitor cells 23*a*, 23*b* is invalidated; in other words, the e-latch assembly 1 may properly operate only when supplied from the main power source 4 of the motor vehicle 3.

On the contrary, the other failures listed above are progressive; in particular, when the measured values (for example capacitance and or resistance values) reach a first alarm threshold, which may suitably be predetermined, the diagnostic module 28 is able to generate a pre-alarm indicating the incoming failure to the user/driver or to service personnel, even when the supercapacitor cells 23*a*, 23*b* are still in a working state.

When the failure then reaches a limit value (and the measured values reach a second predetermined alarm threshold), the diagnostic module 28 may signal the complete failure of the backup energy source 20 and that the e-latch assembly 1 may only operate when connected to the main power source 4 of the motor vehicle 3.

According to an aspect of the present solution, the capacitance of the supercapacitor cells 23*a*, 23*b* is estimated during their lifecycle by the diagnostic module 28, measuring the time that it takes for the supercapacitors to charge from a partially charged voltage to a fully charged voltage, when charging is implemented via a series resistor (the power resistor 24*d* of the charge module 24) directly from the power supply voltage (the battery voltage $V_{batt}$ of the main power source 4).

Figure 4:
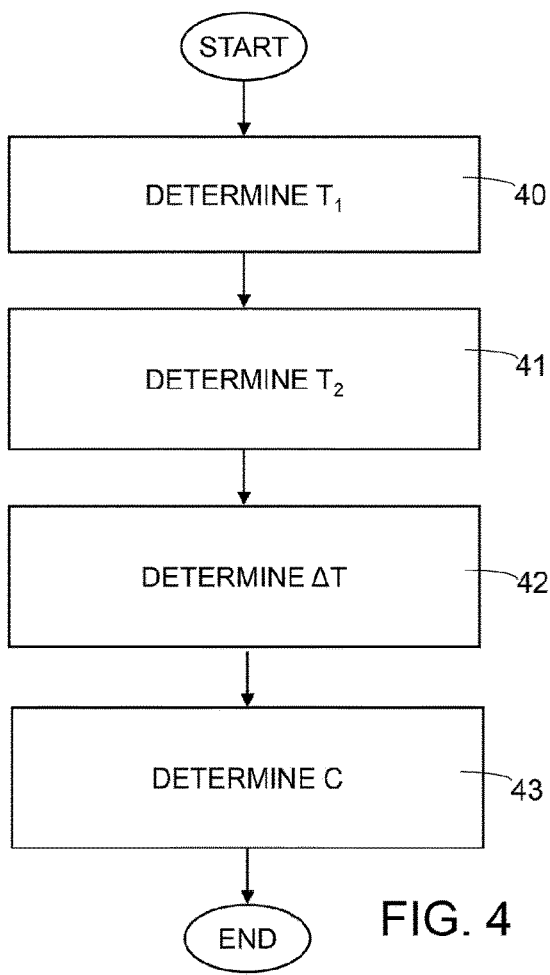
FIGS. 4 and 5 show flowcharts of operations performed by a diagnostic module in the backup power source of FIG. 1.

In particular, and as shown in FIG. 4, the diagnostic module 28 first determines, at step 40, the time $T_1$ to reach a partially charged voltage $V_1$, having a non zero value, starting from a completely discharged state, the time $T_1$ to reach a partially charged voltage $V_1$ based on the following expressions:

$$V_1 = V_{batt}\left(1 - e^{\frac{-T_1}{R \cdot C}}\right)$$

$$T_1 = -R \cdot C \cdot \ln\left(1 - \frac{V_1}{V_{batt}}\right)$$

The diagnostic module 10 then determines, at step 41, the time $T_2$ to reach a fully charged voltage $V_2$ based on the following expressions:

$$V_2 = V_{batt}\left(1 - e^{\frac{-T_2}{R \cdot C}}\right)$$

$$T_2 = -R \cdot C \cdot \ln\left(1 - \frac{V_2}{V_{batt}}\right)$$

In the above expressions, C is the supercapacitor capacitance (either of the whole series, if the supercap voltage $V_{sc}$ is considered, or of a first one of the supercapacitor cells 23a, 23b, if the voltage at the intermediate node 22c is considered), and R is the resistance of the power resistor 24d.

The charge time $\Delta T$ needed for charging from the partially charged voltage $V_1$ to the fully charged voltage $V_2$ is then determined, at step 42:

$$\Delta T = T_2 - T_1 = R \cdot C \cdot \left(\ln\left(1 - \frac{V_1}{V_{batt}}\right) - \ln\left(1 - \frac{V_2}{V_{batt}}\right)\right)$$

$$\Delta T = R \cdot C \cdot \ln\left(\frac{V_{batt} - V_2}{V_{batt} - V_1}\right)$$

or:

$$\Delta T = C \cdot (R \cdot (\ln(V_{batt} - V_2) - \ln(V_{batt} - V_1)))$$

and the value of the capacitance C is determined at step 43, as:

$$C = \Delta T / (R \cdot (\ln(V_{batt} - V_2) - \ln(V_{batt} - V_1)))$$

or:

$$C = \frac{\Delta T}{K(V_{batt})}$$

where:

$$K(V_{batt}) = (R \cdot (\ln(V_{batt} - V_2) - \ln(V_{batt} - V_1)))$$

In particular, since R, $V_1$ and $V_2$ have preset and known values, complex logarithmic calculations may be avoided during run-time, if the values for K at the possible different battery voltages are pre-calculated and stored in a table (which may be included in the embedded memory 21b of the control unit 21).

Concerning the accuracy on the capacitance estimation by the diagnostic module 28, the following considerations may be made, referring to an exemplary case and to exemplary values.

Resistance R may have an absolute accuracy of 5%; in this case, the resistance of the power switch 24c, for example equal to 100 mΩ (that should be summed to the resistance R) is much lower than the 5% value.

Time $\Delta T$ may have an absolute accuracy of 2%, due to internal oscillator tolerance over the full temperature range (the oscillator being checked and verified by the control unit 21, in a known manner, here not discussed in detail). If charging of the supercap group 22 is PWM controlled through the power switch 24c, charge time $\Delta T$ is corrected, multiplying it by the PWM duty cycle.

Voltage values appear as ratios and not as absolute values, so that the absolute accuracy of the voltage measurements does not influence the accuracy on the capacitance estimation.

The battery voltage $V_{batt}$ is to be decreased by the voltage drop over the selection diode 26j; this voltage is low, in absolute value, and varies in a range of +/−100 mV for a fixed current. An absolute accuracy of 3% may be associated to the measurement of the battery voltage $V_{batt}$, also taking into account discretization errors (due to analog to digital conversion at the control unit 21 of the electronic control circuit 10).

The final accuracy in the measurement of the capacitance value is therefore about 10%, summing 5% for resistance measurement, 2% for timing measurement and 3% for voltage measurement and discretization error.

The value of the battery voltage $V_{batt}$, although supposed to be constant, during normal operation is subject to variations, during charging of the supercap group 22.

In order to take into account this aspect, the diagnostic module 28 is configured to measure the variation of the battery voltage $V_{batt}$ and to stop or cancel measurement of the capacitance C, if a variance of the battery voltage $V_{batt}$ during a given time period is above a determined threshold value.

For low variance values of the battery voltage $V_{batt}$, calculation may still be made, using a lowest value of $V_{batt}$ (among those detected in the considered time period), so as to obtain a lower capacitance estimation.

According to another aspect of the present solution, the equivalent series resistance (ESR) of the supercap group 22 is estimated, during operation, by the diagnostic module 28 based on the charging method, in particular to check if it is lower than a required maximum value.

When applying a charging current, the voltage across the supercap group 22 is increased by the product of the charging current by the equivalent series resistance. In particular, when the charging current is zeroed, the value of the supercap voltage $V_{sc}$ will immediately decrease by the voltage drop on the equivalent series resistor.

Using an analog to digital converter with a resolution of n bit, for example 10 bits, and a full scale voltage (FS), for example of 5 V, the resolution dV for the measurement of the supercap voltage $V_{sc}$ is:

$$dV = \frac{FS}{2^n} = \frac{5}{2^{10}}V = 5 \text{ mV}$$

The above AD converter may be implemented within the control unit 21, in particular by the computing module 21a.

The rated value of ESR may be equal or lower than 100 mΩ, so that, in order to obtain a resistance resolution dR of for example 10 mΩ (1/10 of the average value), the minimum charging current $I_{ch}$ is:

$$I_{ch} = \frac{dV}{dR} = \frac{5}{10} = 500 \text{ mA}$$

Figure 5:
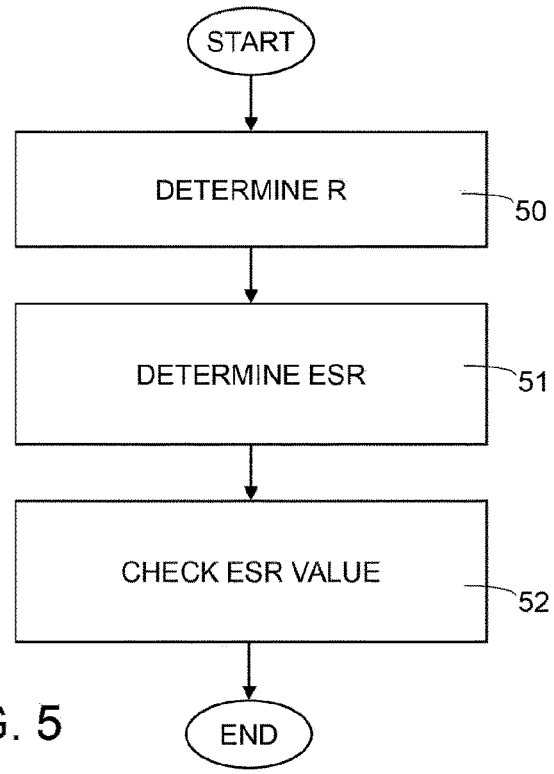

The resistance R of the power resistor 24*d* is calculated as follow by the diagnostic module 28 at a first step 50, as shown in FIG. 5:

$$R = \frac{V_{batt} - V_{sc}}{I_{ch}} = \frac{12\text{ V} - 5\text{ V}}{500\text{ mA}} = 14\text{ }\Omega$$

considering a minimum value for ESR detection for the battery voltage $V_{batt}$, and a maximum value for the supercap voltage $V_{sc}$.

As previously discussed, the power switch 24*c* in the charge module 24 may conveniently be controlled via a PWM modulation scheme, so as to reduce power dissipation on the power resistor 24*d*.

Figure 6:
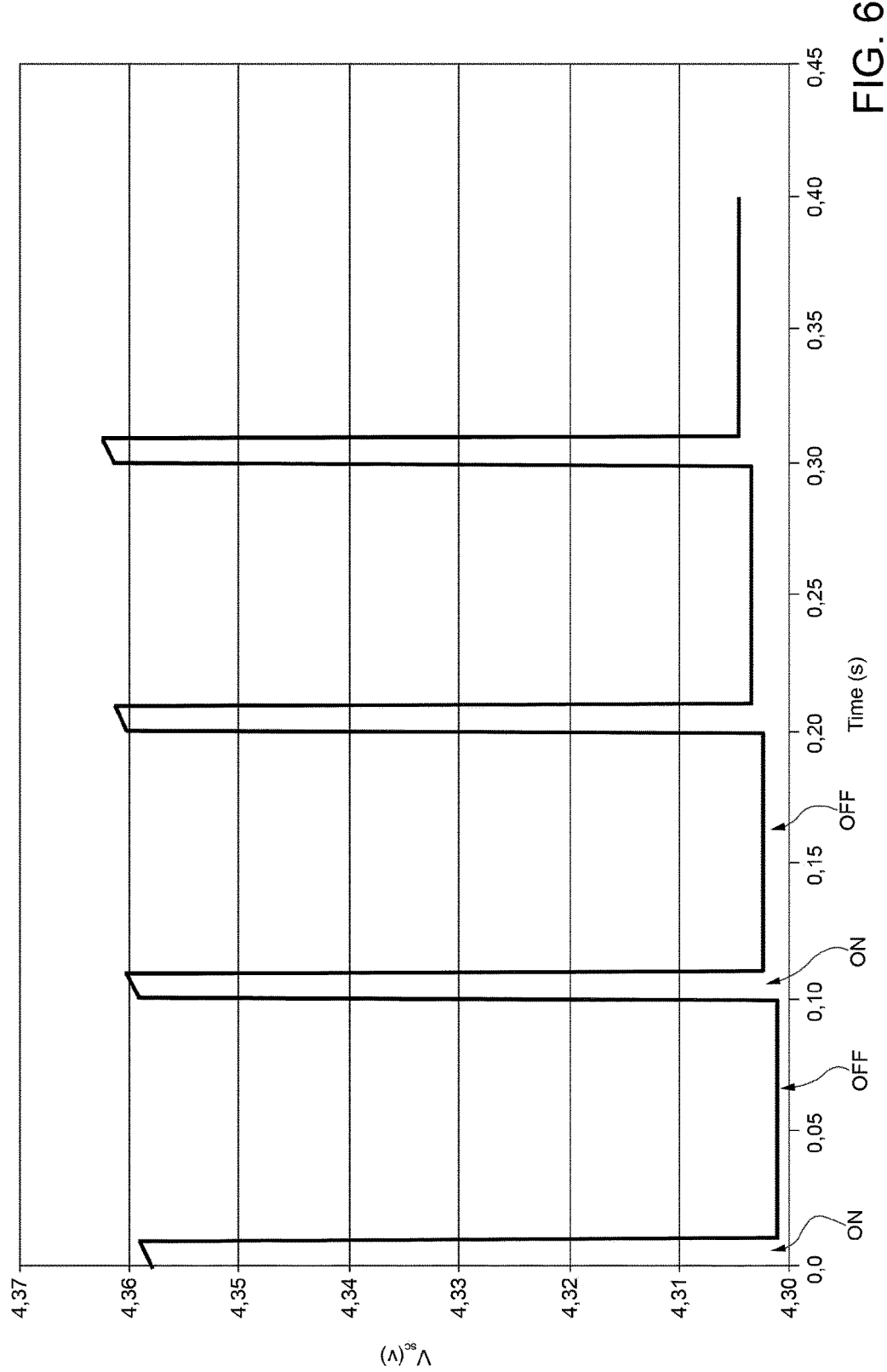
FIG. 6 is a plot of an electric signal in the electronic control circuit of FIG. 2.

In this regard, FIG. 6 shows a possible PWM pattern of the supercap voltage $V_{sc}$, during charging of the supercap group 22, having, at each period, an ON phase followed by an OFF phase, whose respective duration is determined by the duty cycle of the charge-enable signal En_ch.

In this situation, advantageously, the resistance measurement may be carried out, at each period of the charge-enable signal En_ch, in the OFF phase of the duty cycle (that is when the charging current is zeroed due to opening of the power switch 24*c*). A suitable average of the various measurements may be implemented, in order to get an averaged resulting value.

Based on the above, the ESR may be estimated via the following expression, by the diagnostic module 28 at step 51, as shown in FIG. 5:

$$ESR = R\frac{\Delta V_{sc}}{V_{batt} - V_{sc}}$$

wherein $\Delta V_{sc}$ is the voltage drop across the supercap group 22 due to the charging current $I_{ch}$.

Diagnostic module 28 is then able to check, at step 52, if the determined ESR value is lower than a required value.

Voltages are used as ratios, so that the corresponding accuracy of the AD converter is not relevant for the overall measurement accuracy.

The measurement tolerance on R is about 5% and is instead reflected in the ESR measurement.

If the voltage accuracy is 0.5%, the total estimation error is expected to be lower than 10%.

According to a further aspect of the present solution, the diagnostic module 28 is also configured to take into account the temperature conditions, in which the e-latch assembly 1 and supercap group 22 operate. These temperature conditions are monitored by the temperature sensor 29.

Indeed, supercapacitor performance is directly influenced by the temperature conditions and by the operating life time.

Figure 7A:
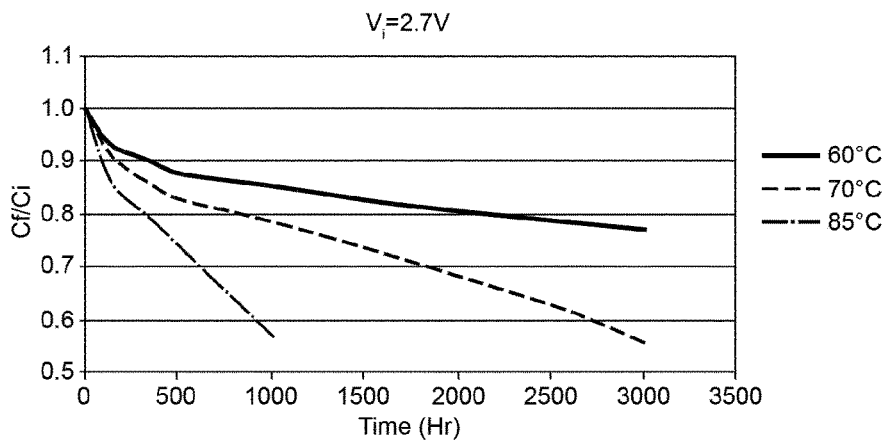
FIGS. 7a-7c show plots of a capacitance quantity in the electronic control circuit of FIG. 2, at different operating conditions.
Figure 7B:
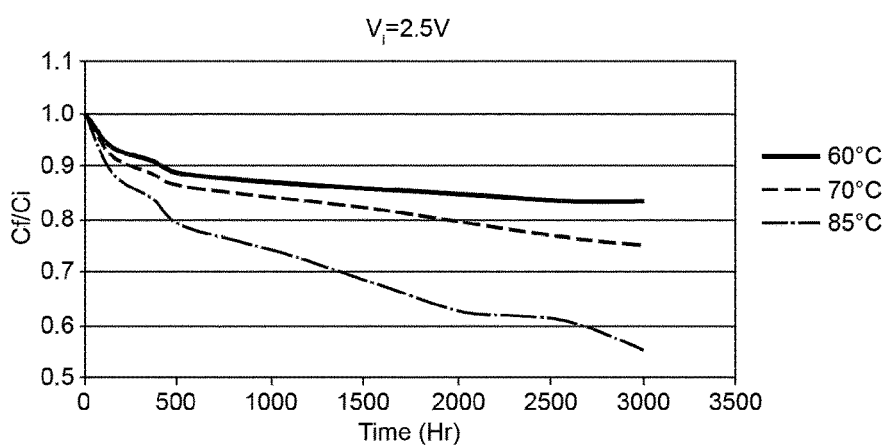
Figure 7C:
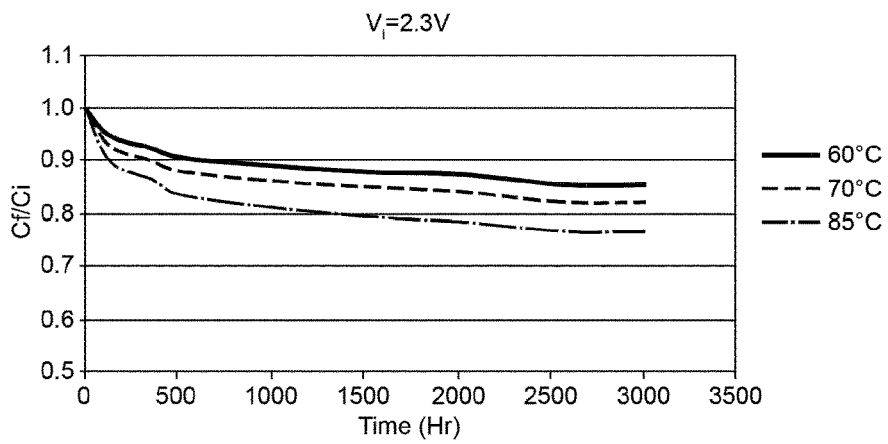

As shown in FIGS. 7*a*-7*c*, the capacitance of a supercapacitor is directly correlated to life time, showing a decrease over time (shown is the ratio between a final value $C_f$ and an initial value $C_i$); moreover, the rate of this decrease is influenced by the operating temperature and the initial voltage $V_i$ value across the same supercapacitor.

Automotive systems have to be able to withstand very high temperatures (for example up to 70° C.-100° C.), while assuring a correct operation, or at least avoiding failures.

In the present solution, the supercap group 22 has to assure energy backup, to allow the user to exit the vehicle in case of malfunctions (for example battery, fuses or wiring harness malfunctions); at temperatures as high as 70° C.-100° C., the user cannot remain trapped inside the motor vehicle 3.

In order to allow proper use of the supercap group 22 even at high temperatures, the diagnostic module 28 is therefore configured to implement a suitable decrease strategy for the value of the supercap voltage $V_{sc}$, while temperature increases (this value being controlled by a suitable modification of the charging process through the charge module 24).

Figure 8:
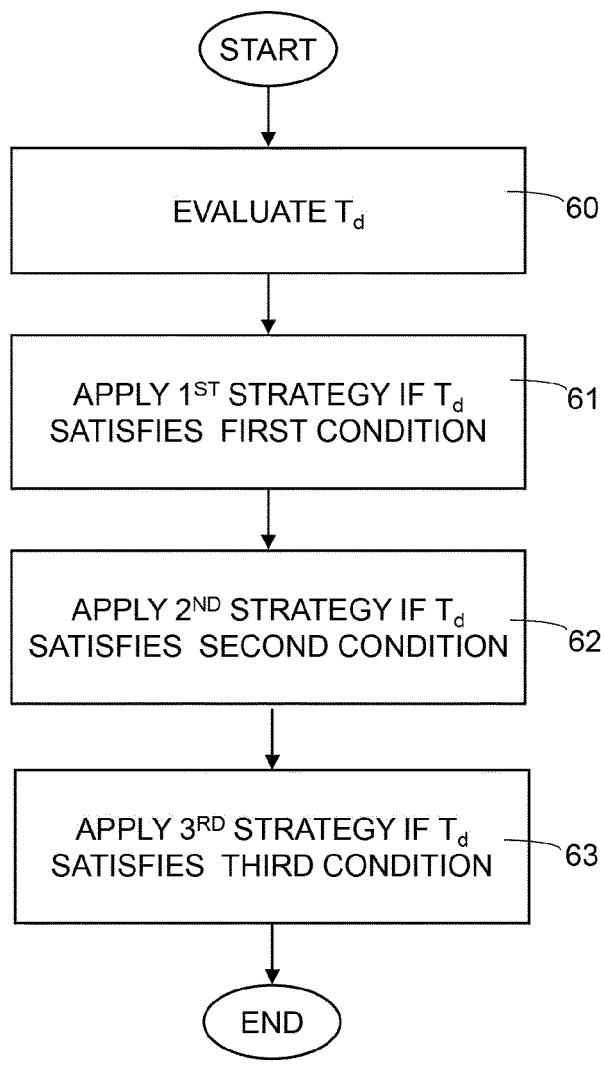
FIG. 8 shows a flowchart of further operations performed by the diagnostic module in the backup power source of FIG. 1.

Accordingly, as shown in FIG. 8, the diagnostic module 10 monitors the value of detected temperature, as shown in step 60.

The strategy implemented by the diagnostic module 28 then envisages three different operating conditions, in respective temperature intervals:

for temperatures comprised between $-\text{Temp}_1$ and $+\text{Temp}_1$, step 61, where Temp' is a first temperature threshold, whose absolute value is about 38° C.-42° C., for example 40° C., the supercap group 22 is kept fully charged (for example with a voltage level of each supercapacitor cell 23*a*, 23*b* in the range of 2.5 V-2.7 V);

for temperatures comprised between $+\text{Temp}_1$ and $+\text{Temp}_2$, step 62, where $\text{Temp}_e$ is a second temperature threshold, whose absolute value is about 85° C.-90° C., for example 85° C., a voltage decrease, for example of the linear type between a first value (for example 2.5 V) and a second value lower than the first (for example 2.1 V), is applied to the supercap voltage $V_{sc}$; and for temperatures higher than $+\text{Temp}_2$, step 63, the supercap group 22 is discharged up to a supercap voltage $V_{sc}$ of a third value, lower than the second value (for example 1 V for each supercapacitor cell 23*a*, 23*b*).

According to the above temperature strategy, the decrease of the supercap voltage $V_{sc}$ at higher temperatures allows to reduce the effect of capacitance variations over time, thus improving reliability of the supercap group 22, for example when used in the backup energy source 20. Moreover, the life time of the same supercap group 22 is extended.

In general, the supercapacitors are available when actually needed and an improved life time may be achieved; in this regard, it has been shown, via simulation, that this control strategy allows to achieve at least 15 years of reliable life time for the supercap group 22.

The advantages of the discussed solution are clear from the foregoing description.

In particular, a reliable backup energy source 20 is provided for automotive applications, for example to power the e-latch assembly 1 in case of failure of the main power source 4 of the motor vehicle 3, and/or in case of disconnection of the e-latch assembly 1 from the same main power source 4.

The backup energy source 20 may be independently controlled by the internal control unit 21, and may also be activated and deactivated without any action from the vehicle main management unit 12 and the related control software.

The use of supercapacitors, in particular a reduced number thereof, and the associated voltage boost circuit, may allow to provide the backup energy source 20 in a cheap, light and small package; the resultant size and form factor of the energy backup source 20 is such as to allow integration within the same case 11 of the e-latch assembly 1.

The use of supercapacitors may also allow to achieve high energy density, high capacity and high output current capability, and avoids memory effects and minimize consumption and recharge time. Life time of the supercapacitor group is also very high, thus allowing the use thereof as a reliable backup energy source, without requiring additional backup power sources.

The use of low voltage supercapacitors, for example of the type commonly available in the market, may also allow to reduce the costs of the system and improve its maintainability.

Moreover, embodiments according to the present description may allow to timely diagnose any fault of the supercapacitor cells 23a, 23b in the supercap group 22, such as open circuit or short circuit conditions, increase resistance and/or decrease of the capacitance value.

The discussed temperature control strategy may allow to use supercapacitors reliably as the backup energy source 20 even at very high temperatures, so as to comply with safety requirements, in particular relating to automotive applications.

Clearly, changes may be made to what is described and illustrated herein without, however, departing from the scope defined in the accompanying claims.

In particular, the electrical connection of the supercapacitor cells 23a, 23b could be a parallel connection, instead of a series connection, in order to provide the supercapacitor voltage $V_{sc}$, required as a backup supply voltage for the actuation group 6' of the motor vehicle 3. The number of supercapacitor cells could also be different, in case of different size or energy requirements.

Moreover, it is again underlined that the e-latch assembly 1 may operate any kind of different closure devices within the motor vehicle 3.

During the emergency situation, causing disabling of the operation of the (external and/or internal) handles 16 of the motor vehicle 3, or in general opening of the doors 2, may also be implemented by the control unit 21 by controlling any suitable physical disabling means coupled to the doors 2 and/or the handles 16 and/or the actuation group 6' thereof (the disabling means being configured to mechanically prevent opening of the same doors 2).

In general, the backup energy source 20, and the discussed diagnostic and control algorithms for checking the status of the supercapacitor cells 23a, 23b, may be used also for other purposes, within the motor vehicle 3, for different automotive applications.

The invention claimed is:

1. An electronic latch assembly for a closure device of a motor vehicle, including an actuator group operable to control actuation of the closure device and an electric motor controllable to drive the actuator group, the electric motor being designed to be supplied, during a normal operating condition, by a main power source of the motor vehicle providing a main supply voltage ($V_{batt}$), wherein the electronic latch assembly includes a backup energy source, and a control unit configured to control the backup energy source to supply the electric motor during a failure operating condition, different from the normal operating condition,
wherein the backup energy source includes a supercapacitor group, configured to store energy during the normal operating condition and to provide a backup supply voltage ($V_{sc}$) to supply the electric motor during the failure operating condition,
wherein the backup energy source and the control unit are arranged within a case of the electronic latch assembly;
wherein the backup energy source further includes a boost module, coupled to the supercapacitor group and configured to receive at its input the backup supply voltage ($V_{sc}$) generated by the supercapacitor group, and configured to boost a level of the backup supply voltage ($V_{sc}$) during the driving of the electric motor and during the failure operating condition to provide at its output a boost voltage ($V_{boost}$) that is higher than the backup supply voltage ($V_{sc}$) to drive the electric motor; and
wherein the backup energy source includes an equalization module, coupled to the supercapacitor group comprising super capacitor cells, and operable to determine a desired voltage level on each of the supercapacitor cells.

2. The assembly according to claim 1, wherein the supercapacitor group comprises first and second supercapacitor cells, connected to each other, to jointly provide the backup supply voltage ($V_{sc}$).

3. The assembly according to claim 2, wherein the first and second supercapacitor cells are of the low voltage and high capacity type, each designed to provide a voltage in the range of 2.5 V-2.7 V and having a capacity in the range of 16 F-20 F.

4. The assembly according to claim 1, wherein the backup energy source includes a charge module that is controllable by the control unit to charge the supercapacitor group, during the normal operating condition whenever the main supply voltage ($V_{batt}$) is higher than a preset threshold, wherein the charge module includes a charge resistor element coupled to the supercapacitor group, and a charge switch element, coupled between an input terminal receiving the main supply voltage ($V_{batt}$) and the charge resistor element, and having a control terminal, wherein the control unit is configured to provide a charge-control signal (En_ch) to the control terminal of the charge switch element to control charging of the supercapacitor group.

5. The assembly according to claim 4, wherein the charge-control signal (En_ch) is a pulse width modulated signal, during the normal operating condition, having a duty cycle defining an ON phase, when the supercapacitor group is charged by the main supply voltage ($V_{batt}$), and an OFF phase where charging of the supercapacitor group is interrupted.

6. The assembly according to claim 1, wherein the supercapacitor group includes at least first and second supercapacitor cells, series connected to provide the backup supply voltage ($V_{sc}$), wherein the equalization module includes a first equalization resistor element, designed to be selectively connected in parallel to the first supercapacitor cell by a first equalization switch element controlled by an equalization signal (En_eq) provided by the control unit, and a second equalization resistor element, designed to be selectively connected in parallel to the second supercapacitor cell by a second equalization switch element controlled by the equalization signal (En_eq), wherein the equalization signal (En_eq) is designed to selectively interrupt current flow in the first and second equalization resistor elements when the supercapacitor group is not providing the backup supply voltage ($V_{sc}$) to the electric motor.

7. The assembly according to claim 1, wherein the boost module includes a boost converter having an internal controller and a boost-activation switch element, selectively enabled to activate the internal controller to implement the boosting operation, by an external signal (boost_ON) indicative of an external operation on the closure device, wherein the internal controller is configured to maintain the boosting operation until deactivated by the control unit via a deactivation signal (boost_OFF).

8. The assembly according to claim 1, wherein the backup energy source includes a diagnostic module, coupled to the supercapacitor group and configured to monitor an operating status thereof by detecting at least a value of the backup supply voltage ($V_{sc}$), wherein the diagnostic module is configured to detect one or more of the following failure modes of the supercapacitor group: an open circuit failure; a short circuit failure; an increase of a leakage current; an increase of an equivalent series resistance (ESR); and a decrease of the value of capacitance (C).

9. The assembly according to claim 8, wherein the diagnostic module is run by the control unit during operation of the latch assembly, and is configured to estimate the capacitance value of the supercapacitor group, by monitoring the time ($\Delta T$) to charge the supercapacitor group from a preset partially discharged voltage ($V_1$) to a preset fully charged voltage ($V_2$) for the backup supply voltage ($V_{sc}$).

10. The assembly according to claim 9, wherein the backup energy source includes a charge module, controllable by the control unit to charge the supercapacitor group from the main supply voltage ($V_{batt}$) via a charge resistor element having a resistance R, wherein the diagnostic module is configured to estimate the capacitance value of the supercapacitor group via the following expression:

$$C = \frac{\Delta T}{K(V_{batt})}$$

wherein K is given by:

$$K(V_{batt}) = (R \cdot (\ln(V_{batt} - V_2) - \ln(V_{batt} - V_1))$$

and is pre-computed for different values of the main supply voltage ($V_{batt}$) and stored in a table in a memory of the control unit.

11. The assembly according to claim 8, wherein the diagnostic module is run by the control unit during operation of the latch assembly, and is configured to estimate the equivalent series resistance (ESR) of the supercapacitor group to check if it is lower than a preset maximum value, wherein the backup energy source includes a charge module, controllable by the control unit to charge the supercapacitor group with a charging current ($I_{ch}$), and the diagnostic module is configured to estimate the equivalent series resistance (ESR) by measuring a voltage drop on the supercapacitor group, when charging is interrupted and the charging current ($I_{ch}$) zeroed.

12. The assembly according to claim 11, wherein the charge module is controllable to charge the supercapacitor group from the main supply voltage ($V_{batt}$) via a charge resistor element having a resistance R, wherein the diagnostic module is configured to estimate the equivalent series resistance (ESR) of the supercapacitor group via the following expression:

$$ESR = R \frac{\Delta V_{sc}}{V_{batt} - V_{sc}}$$

wherein $\Delta V_{sc}$ is the voltage drop on the supercapacitor group.

13. The assembly according to claim 11, wherein the charge module includes a charge resistor element coupled to the supercapacitor group, and a charge switch element, coupled between an input terminal receiving the main supply voltage ($V_{batt}$) and the charge resistor element, and having a control terminal, wherein the control unit is configured to provide a charge-control signal (En_ch) to the control terminal of the charge switch element to control charging of the supercapacitor group, the charge-control signal (En_ch) being a pulse width modulated signal, during the normal operating condition, having a duty cycle defining an ON phase, when the supercapacitor group is charged by the main supply voltage ($V_{batt}$), and an OFF phase where charging of the supercapacitor group is interrupted, wherein the diagnostic module is configured to estimate the equivalent series resistance (ESR) of the supercapacitor group during the OFF phase of the duty cycle of the charge-control signal (En_ch), when the charging current ($I_{ch}$) is zeroed by the opening of the charge switch element.

14. The assembly according to claim 8, wherein the equalization module is configured to avoid the supercapacitor cells having a cell voltage over a maximum cell voltage level to protect the supercapacitors against overcharging.

15. The assembly according to claim 1, wherein the failure operating condition includes one of: a failure of the main power source of the motor vehicle providing the main supply voltage ($V_{batt}$); a failure of an electrical connection connecting the electronic latch assembly to the main power source of the motor vehicle.

16. A motor vehicle including a closure device and, an electronic latch assembly coupled to the closure device, according to claim 1.

17. The assembly according to claim 1, wherein the boost module is configured to be activated in response to an external signal (boost_ON) indicative of an external operation on the closure device.

18. The assembly according to claim 1, wherein the equalization module is configured to ensure the supercapacitor cells have a same cell voltage value.

19. The assembly according to claim 1, wherein the controller is configured to boost the backup supply voltage (Vsc) generated by the supercapacitor group to provide a driving voltage (Vdrive) to supply the electric motor having the highest voltage between the main supply voltage (Vbatt) and the boost voltage (Vboost).

20. The assembly of claim 1, wherein the controller is configured to activate the boost module when a user external door opening event is detected.

21. The assembly of claim 1, wherein the control unit is configured to prevent an opening of a vehicle door during an emergency condition by controlling at least one of a physical disabling means coupled to the door, a door handle, and the actuation group.

22. An electronic latch assembly for a closure device of a motor vehicle, including an actuator group operable to control actuation of the closure device and an electric motor controllable to drive the actuator group, the electric motor being designed to be supplied, during a normal operating condition, by a main power source of the motor vehicle providing a main supply voltage ($V_{batt}$), wherein the electronic latch assembly includes a backup energy source, and a control unit configured to control the backup energy source to supply the electric motor during a failure operating condition, different from the normal operating condition, wherein the backup energy source includes a supercapacitor group, configured to store energy during the normal operating condition and to provide a backup supply voltage ($V_{sc}$) to supply the electric motor during the failure operating condition, wherein the backup energy source includes: a charge module, controllable by the control unit to charge the supercapacitor group, and a diagnostic module, coupled to the supercapacitor group and configured to monitor the operating temperature of the supercapacitor group and to cooperate with the charge module to implement a charging strategy as a function of the detected operating temperature;

wherein the charging strategy envisages three different charging conditions in respective temperature intervals, according to which:

for temperatures comprised between −$Temp_1$ and +$Temp_1$, the supercap group is kept fully charged, with $Temp_1$ being a first preset temperature value, for temperatures comprised between +$Temp_1$ and +$Temp_2$, a voltage decrease between a first voltage value and a second voltage value, lower than the first voltage value, is applied to the backup supply voltage ($V_{sc}$), with $Temp_2$ being a second preset temperature value, higher than the first preset temperature value, and for temperatures higher than $Temp_2$, the supercap group is discharged up to a third voltage value, lower than the second voltage value.

23. The assembly according to claim 22, wherein the first preset temperature value ($Temp_1$) is in the range 38° C.-42° C., and the second preset temperature value ($Temp_2$) is in the range 85° C.-90° C.

\* \* \* \* \*